(12) United States Patent
Petry et al.

(10) Patent No.: US 7,272,378 B2
(45) Date of Patent: *Sep. 18, 2007

(54) E-MAIL FILTERING SERVICES USING INTERNET PROTOCOL ROUTING INFORMATION

(75) Inventors: Scott M. Petry, Palo Alto, CA (US); Gordon R. Irlam, Redwood City, CA (US); Brian Maggi, Mt. Prospect, IL (US)

(73) Assignee: Postini, Inc., San Carlos, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 11/370,653

(22) Filed: Mar. 8, 2006

(65) Prior Publication Data

US 2006/0155808 A1    Jul. 13, 2006

Related U.S. Application Data

(63) Continuation of application No. 10/672,688, filed on Sep. 26, 2003, which is a continuation of application No. 09/675,609, filed on Sep. 29, 2000, now Pat. No. 6,650,890.

(51) Int. Cl.
*H04Q 7/22* (2006.01)
*H04Q 7/20* (2006.01)

(52) U.S. Cl. ............... 455/403; 455/412.1; 455/466; 713/154

(58) Field of Classification Search ..... 455/410–414.1, 455/466; 709/206; 713/154
See application file for complete search history.

(56) References Cited

U.S. PATENT DOCUMENTS 4,837,798 A    6/1989  Cohen et al.
5,619,648 A    4/1997  Canale et al.
5,627,764 A    5/1997  Schutzman et al.
5,634,005 A    5/1997  Matsuo
5,742,668 A    4/1998  Pepe et al.
5,771,355 A    6/1998  Kuzma et al.
5,796,948 A    8/1998  Cohen
5,832,208 A    11/1998 Chen et al.
5,844,969 A    12/1998 Goldman et al.
5,889,943 A    3/1999  Ji et al.
5,905,777 A    5/1999  Foladare et al.
5,937,161 A    8/1999  Mulligan et al.
5,937,162 A    8/1999  Funk et al.
5,968,117 A    10/1999 Schuetze
5,987,611 A    11/1999 Freund (Continued)

FOREIGN PATENT DOCUMENTS

WO    WO96/35994    11/1996

(Continued)

OTHER PUBLICATIONS

Records/Archives in the News, http://listserv.muohio.edu/scripts/wa.exe?A2=ind990le&L=archives&T=0&F=&S=&P=6980, Jan. 1999, pp. 5-6.

(Continued)

*Primary Examiner*—Simon Nguyen
(74) *Attorney, Agent, or Firm*—Baker & McKenzie LLP

(57) ABSTRACT

Disclosed are methods of managing the delivery, including in certain cases the blocking, of electronic messages based at least in part on an electronic message's IP routing information. Also disclosed are methods of managing electronic messages with an intermediate service and the quarantining and user management of quarantined electronic messages and user profiles for the electronic messaging delivery parameters.

16 Claims, 8 Drawing Sheets

U.S. PATENT DOCUMENTS

| | | | |
|---|---|---|---|
| 5,999,932 A | 12/1999 | Paul | |
| 6,014,429 A | 1/2000 | LaPorta et al. | |
| 6,023,723 A * | 2/2000 | McCormick et al. | 709/206 |
| 6,052,709 A | 4/2000 | Paul | |
| 6,061,718 A | 5/2000 | Nelson | |
| 6,073,165 A | 6/2000 | Narasimhan et al. | |
| 6,075,863 A | 6/2000 | Krishnan et al. | |
| 6,092,194 A | 7/2000 | Touboul | |
| 6,112,227 A | 8/2000 | Heiner et al. | |
| 6,118,856 A | 9/2000 | Paarsmarkt et al. | |
| 6,138,146 A | 10/2000 | Moon et al. | |
| 6,146,026 A | 11/2000 | Ushiku | |
| 6,147,987 A | 11/2000 | Chau et al. | |
| 6,178,331 B1 | 1/2001 | Holmes et al. | |
| 6,249,805 B1 * | 6/2001 | Fleming, III | 709/206 |
| 6,249,807 B1 | 6/2001 | Shaw et al. | |
| 6,263,202 B1 | 7/2001 | Kato et al. | |
| 6,301,245 B1 | 10/2001 | Luzeski et al. | |
| 6,317,751 B1 | 11/2001 | Yeger et al. | |
| 6,321,267 B1 * | 11/2001 | Donaldson | 709/229 |
| 6,334,140 B1 | 12/2001 | Kawamata | |
| 6,335,966 B1 | 1/2002 | Toyoda | |
| 6,389,276 B1 | 5/2002 | Brilla et al. | |
| 6,393,465 B2 * | 5/2002 | Leeds | 709/207 |
| 6,404,762 B1 | 6/2002 | Luzeski et al. | |
| 6,411,684 B1 | 6/2002 | Cohn et al. | |
| 6,434,601 B1 * | 8/2002 | Rollins | 709/206 |
| 6,438,215 B1 | 8/2002 | Skladman et al. | |
| 6,442,589 B1 | 8/2002 | Takahashi et al. | |
| 6,453,327 B1 | 9/2002 | Nielsen | |
| 6,487,586 B2 | 11/2002 | Ogilvie et al. | |
| 6,513,045 B1 | 1/2003 | Casey et al. | |
| 6,546,416 B1 * | 4/2003 | Kirsch | 709/206 |
| 6,574,658 B1 | 6/2003 | Gabber et al. | |
| 6,609,196 B1 * | 8/2003 | Dickinson et al. | 713/154 |
| 6,615,258 B1 | 9/2003 | Barry et al. | |
| 6,650,890 B1 | 11/2003 | Irlam et al. | |
| 6,654,787 B1 * | 11/2003 | Aronson et al. | 709/206 |
| 6,691,156 B1 * | 2/2004 | Drummond et al. | 709/206 |
| 6,711,618 B1 | 3/2004 | Danner et al. | |
| 6,779,021 B1 * | 8/2004 | Bates et al. | 709/206 |
| 6,868,498 B1 | 3/2005 | Katsikas | |
| 6,959,324 B1 * | 10/2005 | Kubik et al. | 709/206 |
| 7,058,684 B1 * | 6/2006 | Ueda | 709/206 |
| 7,072,942 B1 * | 7/2006 | Maller | 709/206 |
| 2001/0032095 A1 | 10/2001 | Balbach | |
| 2002/0059454 A1 | 5/2002 | Barrett et al. | |

FOREIGN PATENT DOCUMENTS

| | | |
|---|---|---|
| WO | WO97/12321 | 4/1997 |
| WO | WO97/27546 | 7/1997 |
| WO | WO98/37680 A2 | 8/1998 |
| WO | WO99/06929 | 2/1999 |
| WO | WO99/65256 | 12/1999 |
| WO | WO99/67731 | 12/1999 |
| WO | WO 00/42747 | 7/2000 |
| WO | WO 00/49776 | 8/2000 |
| WO | WO 01/46867 | 6/2001 |
| WO | WO 02/08938 | 1/2002 |

OTHER PUBLICATIONS

Allegro in the News, Mail.com's Allegro Subsidiary Surpasses 200,000 Corporate Users of its Mailzone Service, http://web.archive.org/web/20040617033735/www.allegro-group.com/news/083199.html, Aug. 31, 1999.

MailZone Managed Messaging, MailWatch the Next Generation of MailZone Email Firewall Service is Released, http://web.archive.org/web/19990504151725/http://www.mailzone.net, 2000.

Mulligan, Geoff. "The Dawn of Electronic Mail". Removing The Spam Email Processing and Filtering. Massachusetts, 1999. Sections 1.3 & 1.4, pp. 11-22.

Supplementary European Search Report, EP 03711094.7 dated Sep. 6, 2005.

European Examination Report, EP 01977347.2 dated Aug. 26. 2005.

"Automated Spam Detection," R. Lonn, Feb. 16, 1999.

http://web.archive.org/web/20000815053401/www.brightmail.com/corporate/overview/.

http://web.archive.org/web/19990128140052/http://www.chooseyourmail.com/.

http://web.archive.org/web/20000815064559/www.commtouch.com/solutions/index.shtml.

http://web.archive.org/web/20001205151400/mailcircuit.com/route.htm.

http://web.archive.org/web/20000824040241/www.messagelabs.com/about/Overview/Overview.htm.

http://web.archive.org/web/20000816134259/www.antivirus.com/products/email-groupware.htm.

International Search Report, Form PCT/ISA/210 dated Apr. 14, 2004, PCT Application No. PCT/US03/04757.

EMC News Release, "EMC Launches Centera, Ushers in New Era of content-Addresses Storage," New York, Apr. 29, 2002, www.emc.com/news/press_releases/view.jsp?id=1254.

CVS.SOURCEFORGE.NET, "Spam Filtering ESMTP Demon", copyright notice dated 2000, publ. at http://cvs.sourceforge.net/viewcvs.py/clocc/clocc/src/donc/smt-p.lisp?rev=1.4.

Bounce Spam Mail, from Albert Yale Software, dated 1997-2000.

CSM Internet Mail Scanner,from CSM-USA, Inc., dated 1999.

CyberSitter AntiSpam, from CyberSitter.com, distributed by Solid Oak Software, circa 1999-2000.

DL MailFilter, from DeadLetter and Leem Han Cheong, dated Nov. 1999.

E-Mail Chompaer, from Lorenzo Pasqualis, dated 1996-97.

E-Mail Remover, from Victor Javier, Virtual Network, Inc., Singapore, dated Mar.-Jul. 1998, and 1999.

FlameThrower, from Eagle Research, Inc., dated 2000.

Interceptor, from Grok Development Ltd., dated 1999-2000.

JOC E-Mail Checker, from JOCSoft and Jose Olice Civit, dated 2000.

Lyris MailShield, from Lyris, undated.

Quickhead-E,. from Danere Software Innovations, dated Mar. 2000.

Spam Attack Pro, circa 1996-97, from softwiz.com.

Spam Buster, from Contact Plus Corp., dated 2000.

SpamEater, from High Mountain Software, dated 1997-2000.

BrightMail, from BrightMail, Inc., dated 1997-2000.

Praetor, from Computer Mail Services, Inc., circa 1998-99.

"MsgTo.com Stops Spam Email", web page circa Nov. 19. 1999, from www.applesforhealth.com.

"The Species Filter", by Rafe Needleman, ed., dated Aug. 6, 1999, from www.RedHerring.com.

Official Sep. 1999 AUP (Auto Update Program) v5.0 Build 447, Product Update Release, winserver.com.

Supplementary European Search Report, EP 01977347 dated Apr. 7, 2005.

* cited by examiner

E-MAIL FILTERING SERVICES USING INTERNET PROTOCOL ROUTING INFORMATION

CROSS-REFERENCE TO RELATED APPLICATION

This Application is a continuation of application Ser. No. 10/672,688, filed Sep. 26, 2003, which is a continuation of application Ser. No. 09/675,609, filed Sep. 29, 2000, now U.S. Pat. No. 6,650,890, issued Nov. 18, 2003, which is commonly assigned with the present application and incorporated herein by reference for all purposes.

FIELD OF ACTIVITY

Disclosed embodiments herein relate generally to electronic messaging, and more particularly to value-added electronic messaging services and techniques for the filtering of e-mails.

BACKGROUND

The adoption of e-mail has occurred at an unprecedented pace. Of routine computer users, most now have or soon will have an e-mail address. Many have more than one e-mail address, e.g., one for work and another for home. E-mail offers unparalleled convenience of written communication.

Besides ubiquitous e-mail, another powerful trend is wireless access via a variety of wireless devices, e.g., cell phones, pagers, hand-held computers such as Palm and Windows CE devices, etc. Service-specific e-mail gateways allow an e-mail message to be sent from the Internet to a particular wireless device. In the case of a Sprint PCS phone, for example, an e-mail may be addressed to #@sprintpcs.com, where # represents the telephone number of the phone. Despite this capability, wireless messaging is greatly complicated by the fact that a person may have multiple wireless devices, and that at a given time, the sender has no way of knowing the person's whereabouts or preferred method of message delivery at that time, let alone the address specifics pertaining to each gateway.

For example, the person may be in the office, in which case desktop e-mail would be preferred, on the road staying at a hotel, in which case cell phone e-mail might be preferred, or on the road away from a major metropolitan area, in which case pager e-mail (which has nationwide coverage in the US) might be preferred. This situation, referred to herein as the "multiple e-mail box conundrum," is illustrated in FIG. 1. An intended recipient B of an electronic message may receive electronic messages through one or more wired devices and/or one or more wireless devices, which may include some or all of the following: an Internet Service Provider (ISP) mail account, a free web mail account, a PDA mail account, a cell phone subscription, and a pager subscription. In each instance, e-mail is delivered through a different server or gateway connected to the Internet, i.e., a ISP mail server, a portal mail server, a PDA mail server, a cellular gateway and a paging gateway. A message originator A may, at various times, use some or all the devices mentioned to send an electronic message. In the multiple e-mail box conundrum, the message originator needs to know which e-mail address to use to reach the user. In turn, the recipient must monitor all accounts and devices to keep track of critical information. Furthermore, in the case of a wireless network gateway, the wireless gateway will typically strip off any e-mail attachments, usually without any notification to the user.

Note that, in FIG. 1, wired devices may be stand-alone or LAN-based. In the case of stand-alone devices, connection to the Internet is typically dial-up access through an ISP. In the case of a LAN-based device, a server on the LAN may be connected to the Internet through an ISP or directly to the Internet without the involvement of an ISP.

Neither ISPs nor wireless providers are well-positioned to offer a complete solution to the electronic messaging problem. ISPs are primarily focused on new customer acquisition and often do not have enough users to attract wireless partners. In the case of wireless providers, users are generally unwilling to switch their primary e-mail address. And wireless vendors are generally unable to integrate with existing e-mail services.

With the widespread adoption of e-mail, there has also occurred the proliferation of junk e-mail, or "spam." Currently, of the hundreds of millions of e-mail messages sent each day, about 30% of those messages may be expected to be junk e-mail. FIG. 2 illustrates "spamming" of the user of FIG. 1. Various companies have addressed the problem of junk e-mail by providing e-mail filtering software that attempts to identify and discard junk e-mail. Typically, such software resides on a destination e-mail server. Such a solution does not scale well; i.e., installing and maintaining e-mail filtering software on e-mail servers grows increasingly difficult as the number of e-mail servers multiplies.

Because of the resources required to install and maintain an e-mail server, various companies have emerged offering e-mail outsourcing in which the e-mail server is provided by a third party outside the organization. E-mail outsourcing off-loads the responsibility for providing and maintaining e-mail service without necessitating any change in domain or e-mail addresses. E-mail is retrieved from an off-site e-mail server provided and maintained by the e-mail outsourcing company. Despite such arrangements, the multiple e-mail box conundrum and the junk e-mail problems remain.

Accordingly, a need exists for a scalable, transparent solution to the junk e-mail problem. Also, a need exists for a unified messaging solution, embracing wireless messaging, that addresses the foregoing drawbacks of the prior art.

SUMMARY OF THE INVENTION

Disclosed is a method for enrolling users of an e-mail entity in an electronic messaging service in which electronic messages are delivered from sending servers to destination servers through electronic message delivery paths. In one embodiment, this is accomplished by inserting an intermediate server into an electronic message delivery path ahead of a destination server by changing a Domain Name Server (DNS) entry associated with the destination server.

The e-mail entity users' junk e-mails are posted to a user-accessible message center website where they are kept for a period of time, and the users are allowed to edit user profiles to govern the handling of the users' messages by the electronic messaging service. Disclosed embodiments provide for self-enrollment by the e-mail entity with the electronic messaging service by inserting the intermediate server in the electronic message delivery path by changing its DNS entry associated with at least one of the entity's destination servers to point to the intermediate server. The method may also provide for automated assent to terms and conditions, specifying billing information, and designating the service start and stop dates. Also described are methods by which users can be enrolled with the messaging service.

Further described are methods by which an electronic messaging service may perform value-added processing on the electronic message, apply the user-selected junk e-mail filters on the electronic message, apply the user-selected virus checkers for checking the electronic message and attachments in the electronic message, block junk e-mails based on content and IP routing information, deliver normal "clean" e-mails to the user's e-mail server, and hold "suspected" e-mails in a quarantine area where notifications are generated and sent to the users thereby allowing user disposition of the e-mails in the quarantine summary upon accessing the message center website.

In yet another aspect, provided is a method for the users of the e-mail entity to customize and configure an initial default user profile assigned by the provider of the electronic messaging service. In addition to utilizing the default user profile provided, the users also have the ability to configure value-added services such as junk e-mail filtering and virus checking, control message delivery, and designate particular e-mail server as their main e-mail system.

In yet a further aspect, the present invention provides a method for the provider of the electronic messaging service to automatically generate a quarantine summary based on content and IP information, apply the user specified value-added services from the user profile, and allow the users to view quarantined e-mails in the quarantine summary in an automatically generated electronic message delivered to the users without the users having to access the messaging center website.

The foregoing has outlined preferred and alternative features of various embodiments of the disclosed principles so that those skilled in the art may better understand the detailed description that follows. Additional features will be described hereinafter that form the subject of the claims appended herein. Those skilled in the art should appreciate that they can readily use the disclosed conception and specific embodiments as a basis for designing or modifying other structures for carrying out the same purposes of the disclosed principles. Those skilled in the art should also realize that such equivalent constructions do not depart from the spirit and scope of the disclosed principles.

BRIEF DESCRIPTION OF THE DRAWINGS

The disclosed principles may be further understood from the following description in conjunction with the appended drawings. It is emphasized that various features may not be drawn to scale. In fact, the dimensions of various features may be arbitrarily increased or reduced for clarity of discussion. In addition, it is emphasized that some components may not be illustrated for clarity of discussion. In the drawings.

DETAILED DESCRIPTION

Figure 3:
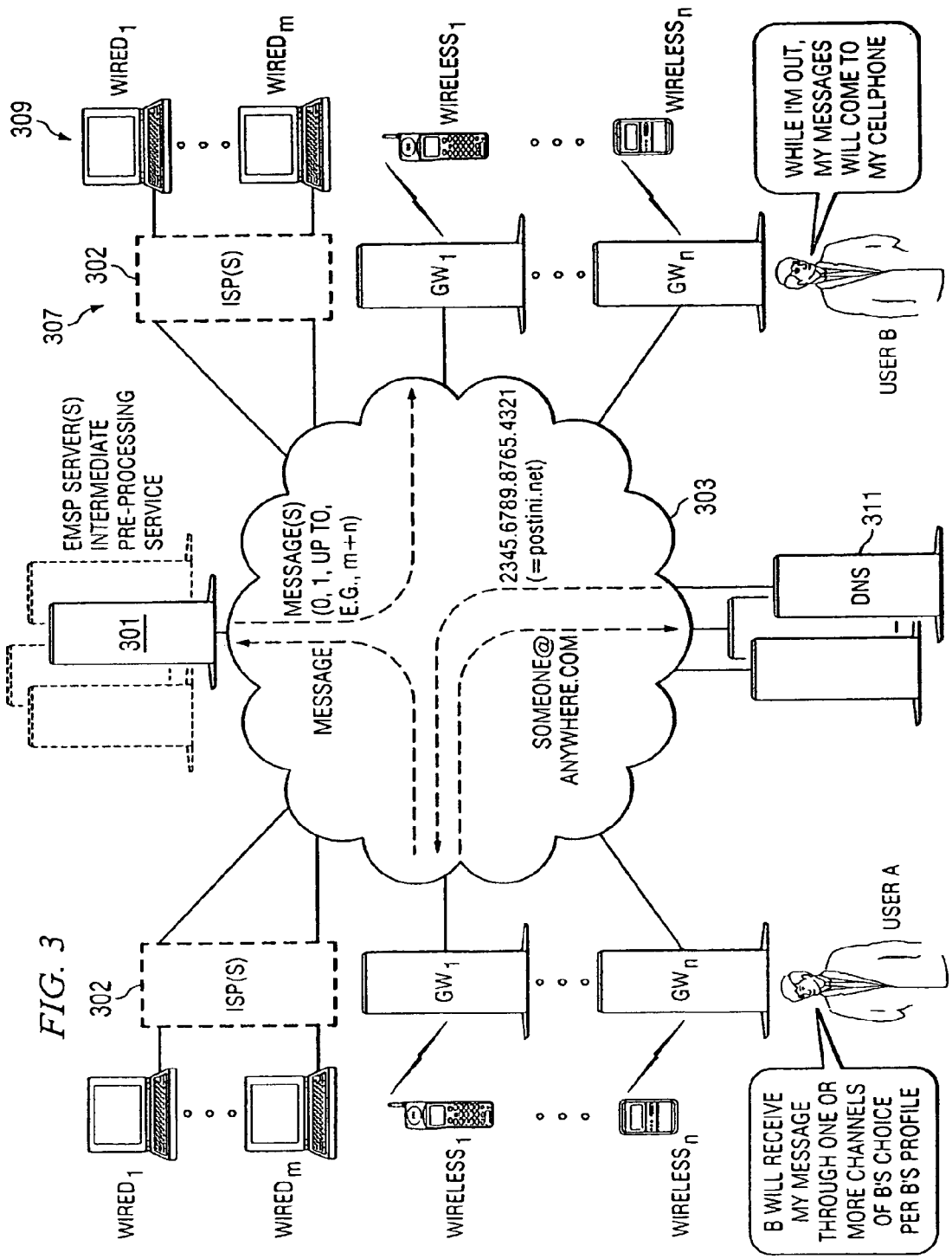
FIG. 3 is a diagram of one embodiment of a unified message delivery system.

Referring now to FIG. 3, a diagram is shown of one embodiment of a unified message delivery system. The system provides for a service that allows the user to define where messages are routed across multiple devices, which portions of messages are routed to which devices, etc. The system allows for ready integration with an end-user's primary e-mail service and is end-user configurable.

Figure 1:
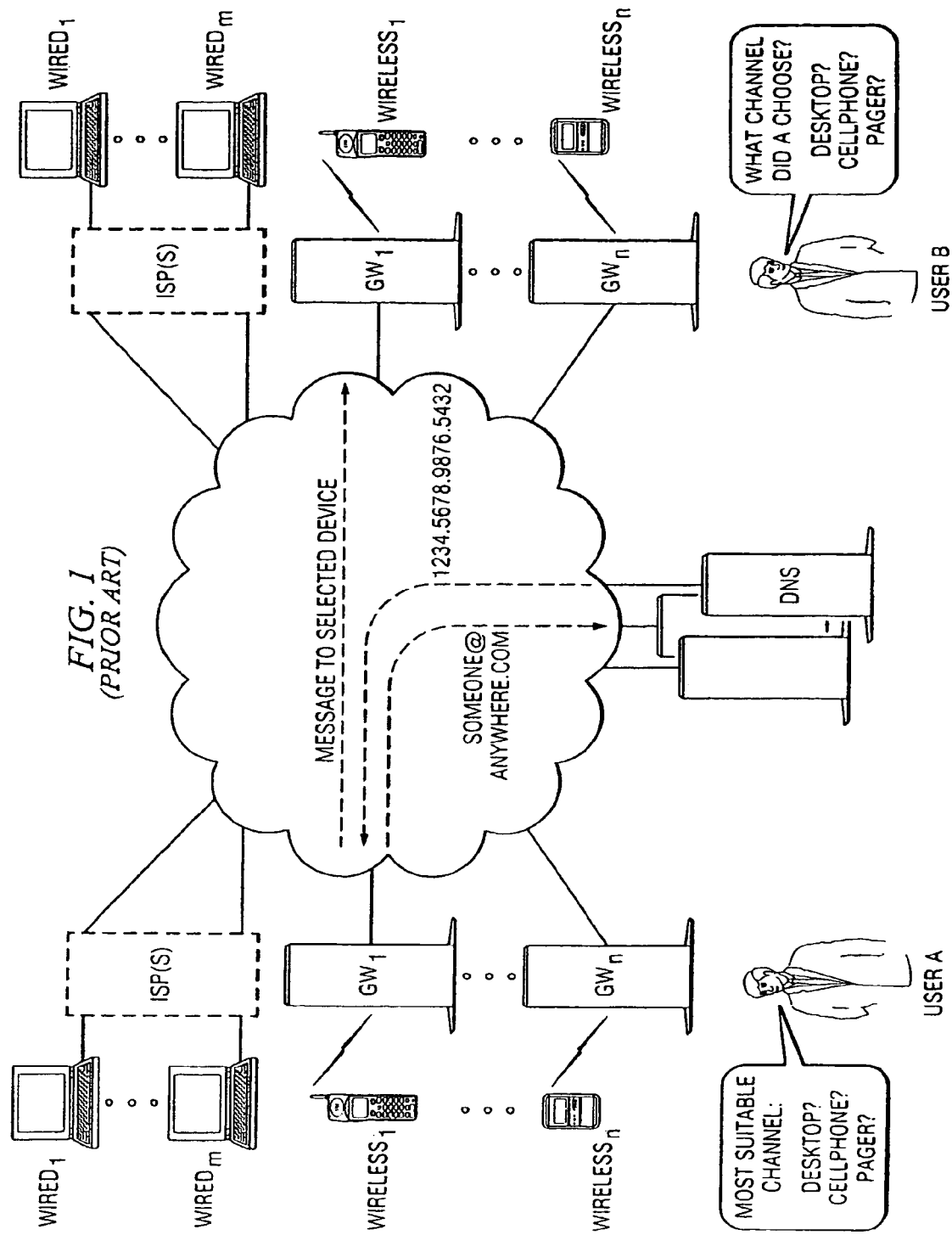
FIG. 1 is a diagram illustrating the multiple e-mail box conundrum.
Figure 2:
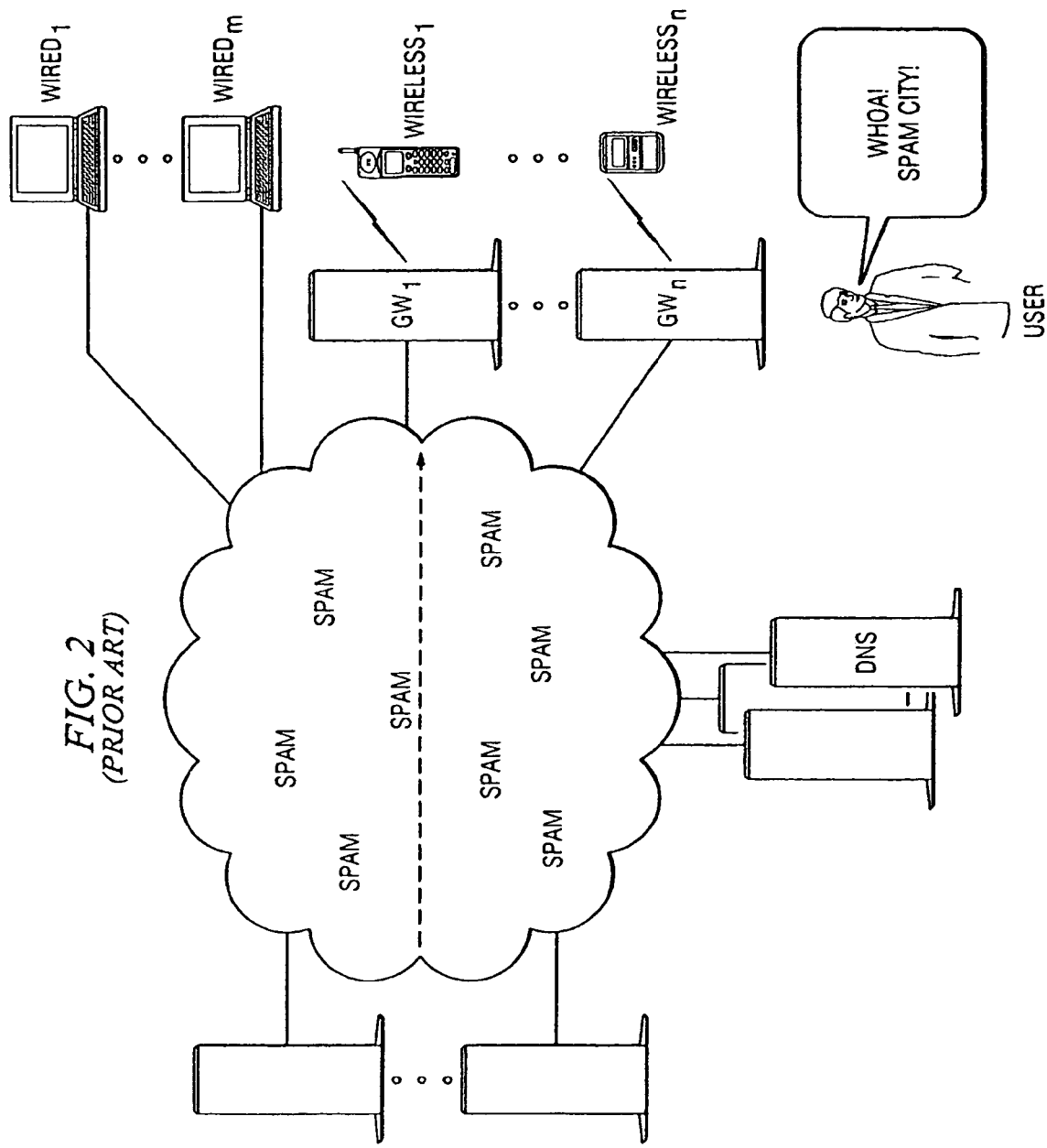
FIG. 2 is a diagram illustrating "spamming" of the user of FIG. 1.

As compared to FIG. 1, in which the electronic message delivery path proceeds through the Internet directly to one of a multiplicity of servers or gateways, in the system of FIG. 3, an intermediate pre-processing service 301 is inserted into the message delivery path. The intermediate pre-processing service 301 preferably comprises an NOC including an array of mail handling machines, a database, a file store, web servers and utility machines. The intermediate pre-processing service 301 is in turn connected to the various servers and gateways of FIG. 1, including, for example, a user's primary ISP 303, if any. Such connection typically also occurs through the Internet (305). The collection of servers and gateways 307 provide e-mail access for a variety of wired and wireless client devices 309, which may include, for example, a main e-mail system (typically a home or office desktop computer), a free web-based mail system (e.g., Yahoo or the like), a PDA (e.g., Palm VII), a cell phone and a pager. A typical user will use two or more of the foregoing electronic message delivery options and some users will use most or all of these options.

By established user-defined preferences, the user is able to control the flow of messages to the various devices. Preferences are configured using web browser software to create or modify a user profile. User profiles are stored in a relational database (not shown) accessible to the intermediate pre-processing service. Note that end-user configuration may occur via any web-enabled device, either wired or wireless. Wireless web access may be supported using technologies presently-known in the art such as Palm's "web clipping" technologies, the UPLink server suite of Phone.com of Redwood City, Calif., Wireless Application Protocol (WAP)-enabled cellphones, etc.

To take a concrete example, there may be three e-mail messages delivered to the intermediate pre-processing service 301 for a particular user, an urgent message, a message from the user's boss, and a message from the user's friend. In this example, the e-mail from the user's friend might be delivered to the user's main e-mail system and to the user's free web mail system. The e-mail from the user's boss might be delivered to the user's PDA. The urgent message might be delivered to the user's cell phone and to the user's pager.

FIG. 3 illustrates the different manner of operation of the message delivery system of FIG. 3, including the intermediate pre-processing service 301, as compared to the conventional electronic message delivery path of FIG. 1. Say, for example, that user A, (e.g., Sue@standford.edu) wishes to send an e-mail to user B (e.g., Tom@aol.com). Sue uses an e-mail program to create, address and send the e-mail. The mail is sent from Sue's computer to the local mail server for Sue's computer, which may reside on Sue's local area network or at an ISP. The local mail server queries a Domain Name Server (DNS) 311 to obtain the IP address for Tom@aol.com. Normally, the local mail server uses the IP address returned by DNS to send the e-mail to the destination e-mail server for Tom's computer, (e.g., mail.aol.com). The e-mail is then delivered to Tom's computer.

In one embodiment of the present system, the normal electronic message delivery path is broken and the intermediate pre-processing service 301 is inserted into the electronic message delivery path. This result is easily accomplished by modifying the appropriate DNS record (such as the MX—mail exchange—record, for example) to point to the intermediate pre-processing service 301 instead of the destination e-mail server (e.g., 303). In this manner, the electronic message delivery path is modified such that the intermediate pre-processing service 301 handles all of the electronic messages that would otherwise have been handled by the destination e-mail server.

Given the ease with which the intermediate pre-processing service may be inserted into the message delivery path, the enrollment of ISPs in cooperative messaging service agreements with the operator of the intermediate pre-processing service (Electronic Messaging Service Provider, or EMSP) may be automated to a great extent. For example, the ISP may visit the web site of EMSP, indicate assent to terms and conditions, and specify billing information and a service start date.

Prior to the service start date, the ISP advises subscribers and arranges for its DNS entries to be modified appropriately as of the service start date.

Prior to the start date, users are advised by e-mail of additional available message center services. Each user is assigned a user name and password in order to access a message center web site. When the user first visits the message center web site, the user creates a profile that will be used thereafter to select and configure value-added service (e.g., junk e-mail filtering and virus checking) and to control message delivery. Within the profile, the user may designated a particular e-mail server as the user's main e-mail system. Profiles place users in control of their mail experience. Alternatively, A service provider can create a default profile of services and the user can visit the message center web site to modify the default configuration.

When the intermediate pre-processing service 301 receives an e-mail, it look ups the addressee's user profile. The intermediate pre-processing service then performs value-added processing of the message. For example, the intermediate pre-processing service may apply user-selected junk e-mail filters and user-selected virus checkers for checking attachments. Junk-e-mail blocking may be based on both content and IP routing information. "Clean" e-mail is delivered to the user's mail server as normal. Suspect messages, instead of being deleted without notification to the user, is held in a quarantine area, and the user is notified. The user can then, if desired, download messages flagged as suspect by accessing the message center web site.

Alternatively or in addition, the intermediate pre-processing service may deliver to the message to one or more wireless devices in accordance with the user profile, e.g., by forwarding the message to one or more servers or gateways 307 the addresses of which have been specified by the user in the user's profile. Prior to forwarding the message to a server or gateway, the intermediate pre-processing service 301 may perform any necessary reformatting to meet the requirements of a particular recipient device.

In general, a user may configure an arbitrary number of communication "channels," each channel including a destination and, optionally, one or more message modification procedures including filters, reformatters, etc. that may affect message presentation, be required for message transport, etc.

The intermediate pre-processing service 301 may perform myriad other types of services. One example of such services involves certain attachments, e.g., rich media items such as MP3, JPEG, MPEG, etc. Such items are notorious "bandwidth hogs" and can easily clog up the message delivery system. Rather than simply delete such items, however, the intermediate pre-processing service 301 allows such items to be intelligently managed. One option is to treat rich media in like manner as junk e-mail. That is, rich media items, instead of being delivered with the e-mail messages to which they are attached, are delivered to the message center web site, and the user is notified. The user can then view/play or ignore the items as desired.

Another option is to produce replacement attachments, i.e., "thumbnail" versions of the rich media items. An option may be provided for the original full attachment(s) to be delivered to the user with a subsequent system-generated e-mail message. For example, a link may be embedded in the thumbnail along with appropriate text advising the user to click on the link to receive the full attachment. In one embodiment, clicking on the link takes the user to a complete, high-resolution image residing in the user's personal message center.

Note that the functionality of the intermediate pre-processing service may be implemented at ISPs rather than at a central NOC without any sacrifice of functionality or any noticeable effect on the end user. In this instance, DNS information remains unchanged. In this scenario, however, ISPs must be persuaded to invest in additional hardware and/or software.

Figure 4:
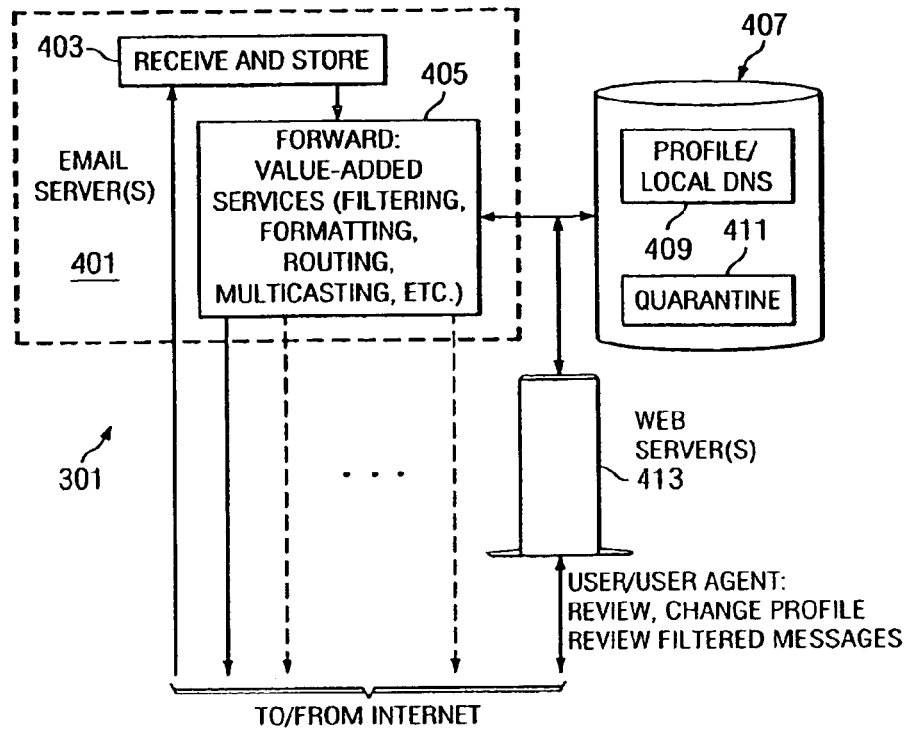
FIG. 4 is a block diagram of one embodiment of the intermediate server(s) of FIG. 3.

Referring to FIG. 4, a generalized block diagram is shown of one embodiment of the intermediate pre-processing service 301 of FIG. 3. One or more messaging servers 401, e.g., e-mail servers, are provided, realizing a receive and store function 403 and a forward function 405. The forward function incorporates various value-added services such as filtering, formatting, routing, multicasting, etc. Due to the multicasting feature of the forward block 405, a single incoming message may result in the forwarding of some greater number of outgoing messages.

The forward block 405 communicates with storage 407, which may include one or more relational databases or file servers. Storage 407 includes profile and local DNS information 409 for each subscriber, as well as a "quarantine" area 411 for storing filtered messages, e.g., messages determined to be unfit to forward. Subscribers are provided access to storage 407 through one or more web servers 413, allowing subscribers to configure their profiles, view filtered messages, etc.

Figure 5A:
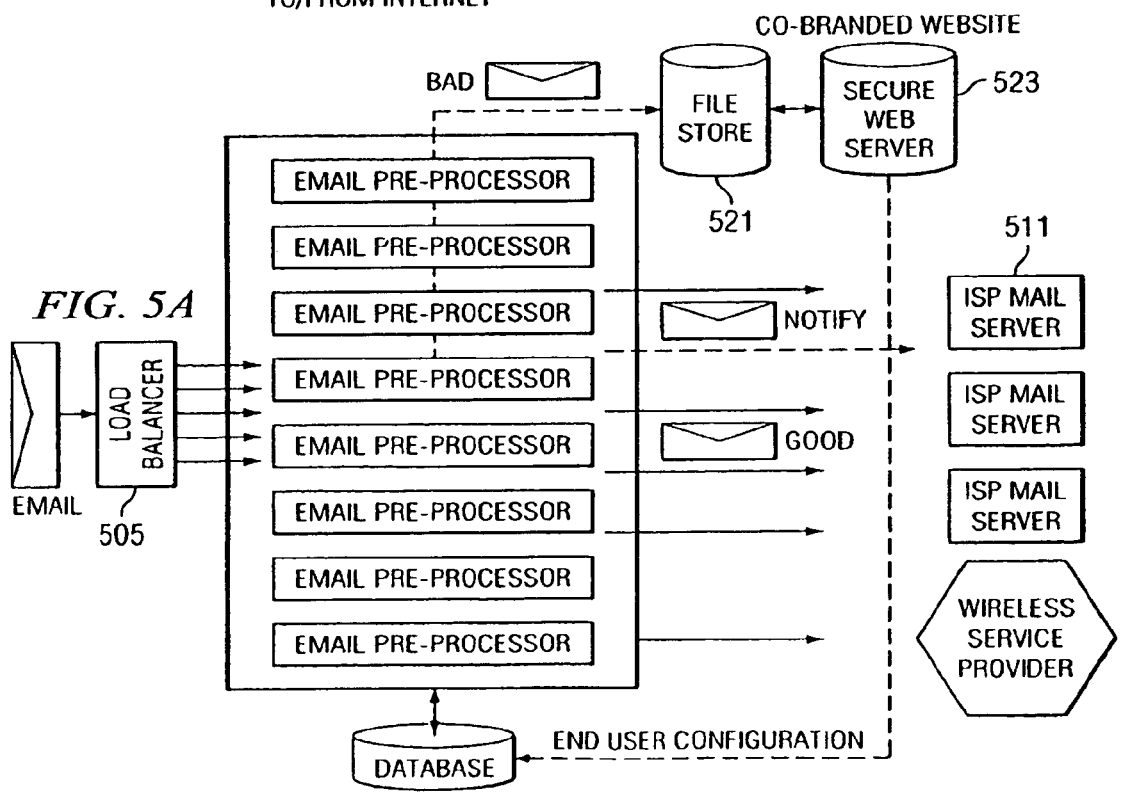
FIG. 5A is a more detailed block diagram of one embodiment of the server of FIG. 4.

Referring to FIG. 5A, a more detailed block diagram is shown of the intermediate pre-processing service 301 in accordance with an exemplary embodiment of the invention. Multiple hosts are defined on both the inbound mail server and the outbound mail server. Each host runs a copy of an appropriate mail program such as FreeBSD Qmail. In one alternate embodiment, a machine or a cluster of machines operates as a mail-receiving machine and a mail-delivering machine. This machine will accept a connection from a sending SMTP server and begin receiving data. Simultaneously, the machine will begin receiving the message data, querying the database for a specific user configuration, processing messages based on configuration, opening a connection to a receiving SMTP server, and delivering it. Standard mail server software is not required for this alternate embodiment.

Incoming mail is routed to an available host by a load balancer 505, or load-sharing switch/router, of a type commonly available from Cisco and other network equipment manufacturers. The server cluster 501 can include a server running a relational database management system such as Oracle, for example. The host queries the database to identify the user and user preferences. The host then processes the message as specified in the user profile. For spam checking, each host runs a copy of an appropriate spam filter. Virus checking can be done using a virus scanning application such as that available from Trend.

Good e-mails are addressed with one or more addresses in accordance with information specified in the user profile and sent to the outbound mail server cluster to be sent out. To deliver a message addressed to user@isp.com, our intermediate preprocessing lookup service looks up user@postinimail.isp.com and delivers. This allows the ISP to update the final delivery location without requiring the intermediate preprocessing service to make any changes. The e-mail is sent to the ISP mail server 511 and possibly to other servers or gateways in accordance with the user profile.

Bad e-mails are saved "in quarantine" on a message center web site, and a notification e-mail is sent to the user. In the illustrated embodiment, the inbound mail server cluster is connected to a file store 521. The file store is in turn connected to a web server 523. When a user logs on to the web server, a web page is displayed that includes a link for displaying a summary of quarantined messages and/or attachments. By clicking on a selected item, the user is able to view the item and, depending on the attachment type, may be able to view the attachment. If the user so chooses, the user may be allowed to download an item suspected to contain a virus after the user has been given appropriate warning.

Figure 5B:
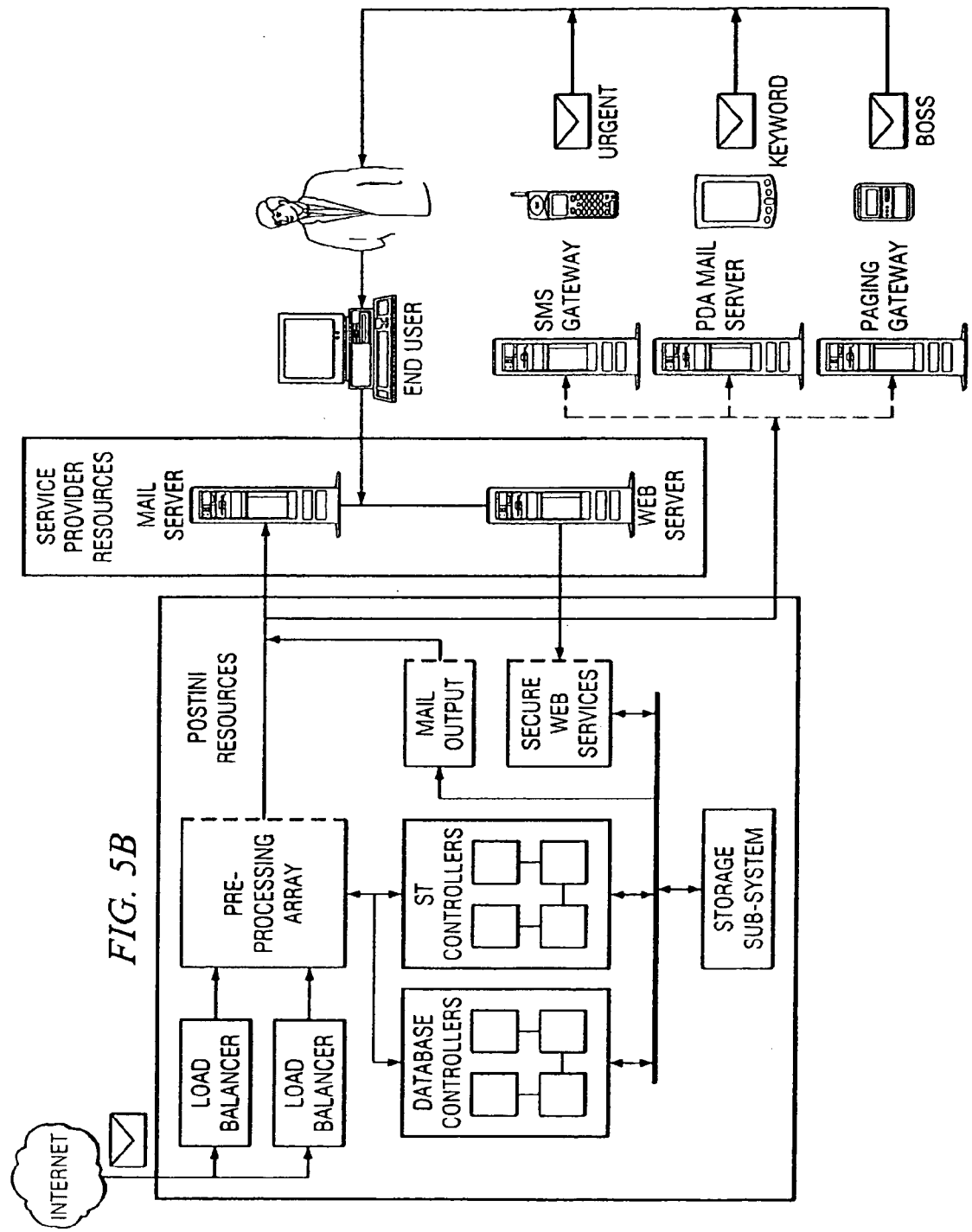
FIG. 5B is an alternate diagram of one embodiment of the server of FIG. 4.

FIG. 5B shows an alternate diagram of a system of the present invention.

Figure 6A:
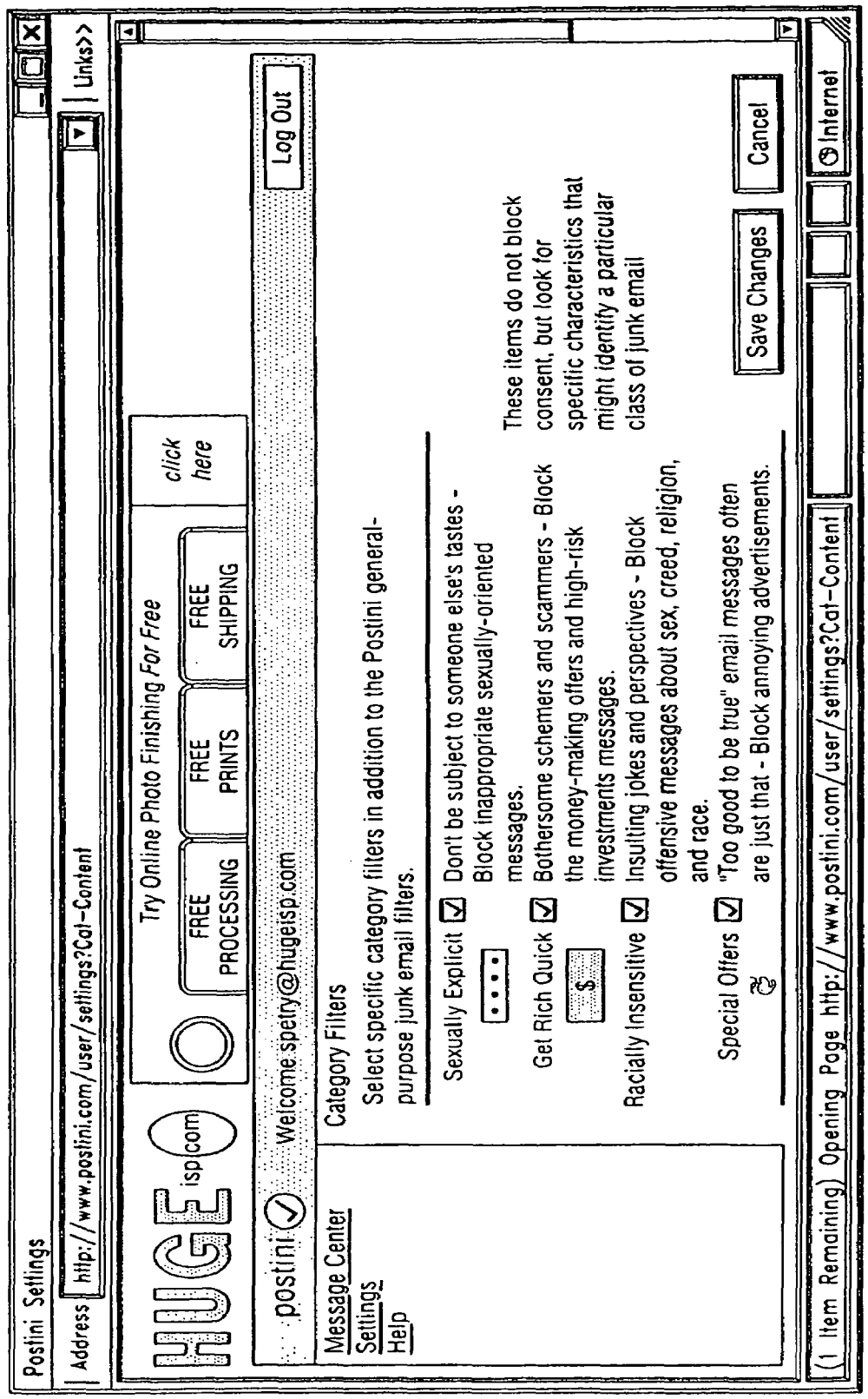
FIG. 6 is a diagram of an exemplary embodiment showing a configuration screen display that may be used to configure the unified message delivery system.
Figure 6B:
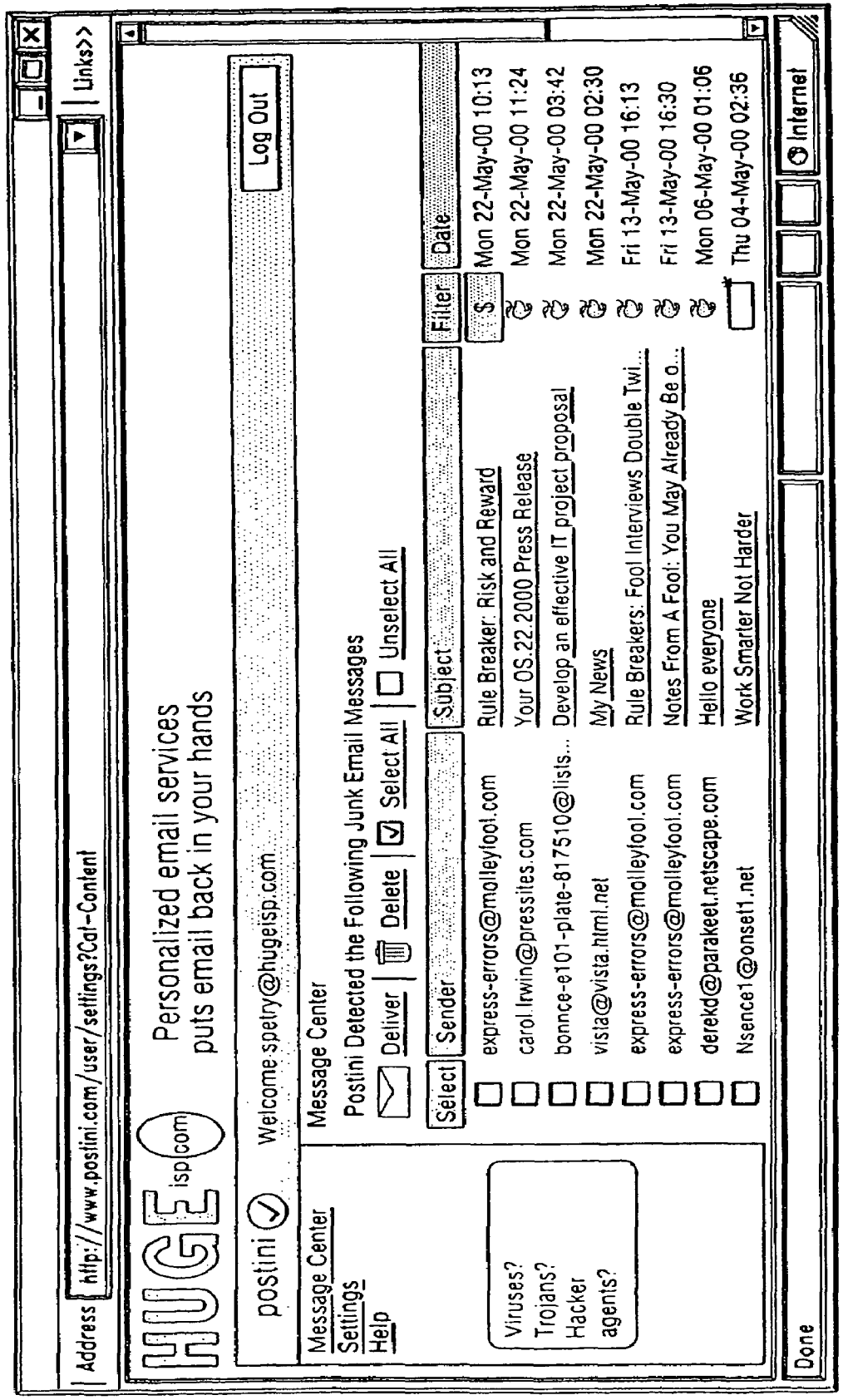

FIG. 6 shows an example of a web form screen display that may be filled out by the user to configure message delivery for that user and subsequently modified to modify the configuration. In the example shown, a subsequent screen display is shown after one of the mail filter items is selected.

In accordance with a further feature of the invention, devices may be provided with a background software routine that periodically notifies the messaging system, automatically, of the time of last user input to the device. This information may be used to dynamically route messages to increase the likelihood of early receipt by the user. For example, a user may specify messages to normally be delivered to the user's cellphone between the hours of 8-9 AM, 12-1 PM and 6-7 PM, and to the user's work between the hours of 9-12 AM and 1-6 PM, in accordance with the user's normal routine. On a particular afternoon, however, the user may be away from the office and may have used his/or her cellphone to receive or make one or more calls, or to access information, etc. If the user has selected a "find me" configuration option, then this usage information may be used to intelligently route messages to the user's cellphone, for example.

The value-added electronic messaging system detailed in the foregoing description provides an elegant solution to the multiple e-mail box conundrum. User-centric in design, the system is end-user configurable and uses an intuitive web metaphor. Based on a scalable architecture, the system works with existing e-mail accounts and does not require hardware or software integration.

Figure 7:
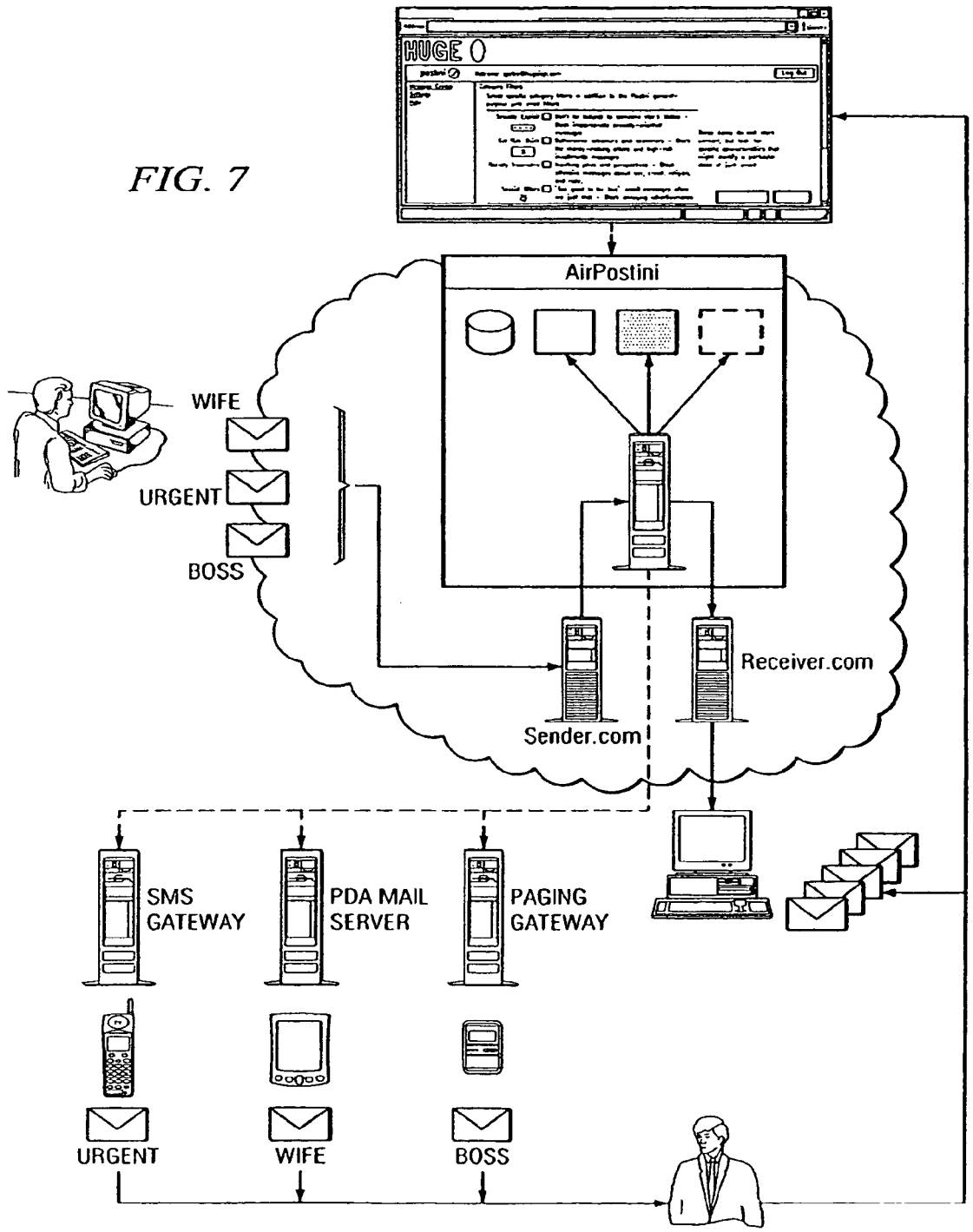
FIG. 7 is a diagram emphasizing end user configuration and mail processing.

FIG. 7 is a diagram of one embodiment of the system of the present invention emphasizing end user configuration and mail processing.

It will be appreciated by those of ordinary skill in the art that systems and methods employing the disclosed principles can be embodied in other specific forms without departing from the spirit or essential character thereof. The presently disclosed embodiments are therefore considered in all respects to be illustrative and not restrictive. The scope of the disclosed principles is indicated by the appended claims rather than the foregoing description, and all changes that come within the meaning and range of equivalents thereof are intended to be embraced therein.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method of managing the delivery of electronic messages from sending e-mail servers to destination e-mail servers, the method comprising:
   inserting an intermediate service into the electronic message delivery path ahead of a destination server by changing a DNS entry associated with the destination server to point to the intermediate service;
   receiving an electronic message sent from a sending e-mail server in the intermediate server;
   examining IP routing information associated with the electronic message; and
   deciding whether to block delivery of the electronic message at least in part based on the examination of the IP routing information and message content.

2. A method according to claim 1 wherein the receiving, examining, and deciding are done in an intermediate service interposed between the sending e-mail server and a destination e-mail server.

3. A method according to claim 2 wherein for a delivered electronic message, the intermediate service is further operable to provide one or more value-added services selected from the group consisting of:
   reformatting the delivered messages;
   routing the messages to users' wireless e-mail addresses;
   multicasting the delivered messages to multiple addresses;
   flagging the delivered messages as "suspect";

removing rich media items from the delivered messages; and providing a thumbnail representations of delivered messages' rich media item.

4. A method according to claim 2 and further comprising providing a user profile accessible to a user through which the user is able to configure the intermediate service for the control of the user's message delivery.

5. A method according to claim 4 and further comprising the intermediate service looking up the user's profile upon receipt of an electronic message addressed to the user and processing the electronic message according to the user's profile.

6. A method according to claim 1 and further comprising placing the blocked electronic message in quarantine at a message center website.

7. A method according to claim 6 wherein the message center website is user-accessible.

8. A method according to claim 1, wherein inserting the intermediate service comprises enrolling an e-mail entity responsible for the destination e-mail server with an electronic messaging service comprising the intermediate service.

9. A method according to claim 8, wherein the e-mail entity self-enrolls itself with the electronic messaging service by inserting the intermediate service in the electronic message delivery path by changing its DNS entry associated with at least one destination server to point to the intermediate service.

10. A method according to claim 8, wherein the enrollment between the e-mail entity and the provider of the electronic messaging service comprises tasks selected from the group consisting of:

automating assent to the terms and conditions;

specifying billing information; and designating electronic messaging service start and stop dates.

11. A method according to claim 8, wherein the e-mail entity is an Internet Service Provider.

12. A method according to claim 1, wherein the IP routing information comprises an IP source address.

13. A method of managing the delivery of electronic messages from sending e-mail servers to receiving e-mail servers, the method comprising:

inserting an intermediate service into the electronic message delivery path ahead of a receiving server by changing a DNS entry associated with the receiving server to point to the intermediate service;

receiving in the intermediate service an electronic message sent from a sending e-mail server to the receiving e-mail server;

examining in the intermediate server IP routing information associated with the electronic message;

deciding whether to block delivery of the electronic message at least in part based on the examination of the IP routing information and message content.

14. A method according to claim 13, and further comprising placing the electronic message in quarantine at a user-accessible message center website if it is decided to block delivery of the electronic message.

15. A method according to claim 13 wherein the deciding whether to block the electronic message is also based at least in part on examining the message content.

16. A method according to claim 13, wherein the IP routing information comprises an IP source address.

* * * * *